(12) United States Patent
Nemavat et al.

(10) Patent No.: US 8,787,163 B1
(45) Date of Patent: Jul. 22, 2014

(54) METHOD AND APPARATUS FOR ADJUSTING THE SIZE OF A BUFFER IN A NETWORK NODE BASED ON LATENCY

(75) Inventors: Pradeep Jugraj Nemavat, Maharashtra (IN); Sandesh Goel, Noida (IN)

(73) Assignee: Marvell International Ltd. (BM)

( * ) Notice: Subject to any disclaimer, the term of this patent is extended or adjusted under 35 U.S.C. 154(b) by 687 days.

(21) Appl. No.: 13/017,448

(22) Filed: Jan. 31, 2011

Related U.S. Application Data

(60) Provisional application No. 61/307,799, filed on Feb. 24, 2010.

(51) Int. Cl.
*H04L 12/54* (2013.01)
(52) U.S. Cl.
USPC .......................... 370/231; 370/234; 370/428
(58) Field of Classification Search
None
See application file for complete search history.

(56) References Cited

U.S. PATENT DOCUMENTS

| 7,660,252 | B1* | 2/2010 | Huang et al. | 370/235 |
| 7,675,857 | B1* | 3/2010 | Chesson | 370/235 |
| 8,184,540 | B1* | 5/2012 | Perla et al. | 370/235 |
| 2004/0240436 | A1* | 12/2004 | Yao et al. | 370/352 |
| 2006/0215676 | A1* | 9/2006 | Ratakonda et al. | 370/412 |
| 2007/0253333 | A1* | 11/2007 | Fortin et al. | 370/230.1 |
| 2008/0092003 | A1* | 4/2008 | Khoche et al. | 714/733 |
| 2010/0309783 | A1* | 12/2010 | Howe | 370/230 |
| 2011/0235513 | A1* | 9/2011 | Ali | 370/232 |
| 2011/0286468 | A1* | 11/2011 | Tomonaga et al. | 370/412 |
| 2012/0213070 | A1* | 8/2012 | Lee et al. | 370/235 |

\* cited by examiner

*Primary Examiner* — Hassan Phillips
*Assistant Examiner* — Duc Duong

(57) ABSTRACT

Systems and methods associated with controlling buffer size based on latency are described. In one embodiment, a method includes determining a transmission latency for a data item exiting a transmission buffer and selectively manipulating a size of the transmission buffer based on the transmission latency for the data item.

19 Claims, 5 Drawing Sheets

Prior Art Figure 1

METHOD AND APPARATUS FOR ADJUSTING THE SIZE OF A BUFFER IN A NETWORK NODE BASED ON LATENCY

CROSS REFERENCE TO RELATED APPLICATIONS

This application claims the benefit of U.S. provisional application Ser. No. 61/307,799 filed on Feb. 24, 2010, which is hereby wholly incorporated by reference.

BACKGROUND

Network nodes (e.g., stations, access points, bridges, routers) typically receive data via an ingress interface and transmit data via an egress interface. For example, data intended for a network node enters the network node through an ingress interface, and data having originated in the network node is transmitted from the network node through an egress interface. However, in some cases, data not intended for a particular network node may be received by the network node. In such cases, the data only transits the node and is subsequently retransmitted by the network node. A conventional network node typically buffers data that transits the network node.

The ingress interface(s) of a network node may operate at a different speed than the egress interface(s) of a network node. For example, when the ingress interface is a bus and the egress interface is a noisy wireless interface, the ingress interface may be significantly faster than the egress interface. Thus, data may be received faster than the data can be retransmitted. Buffering received data before retransmitting the data facilitates resolving some issues associated with mismatches between ingress rates and egress rates. For example, "bursty" traffic may be received via a fast ingress interface at a network node. The burst may overwhelm the egress interface, and thus some data to be retransmitted may be buffered. While buffering data may address some issues, buffering data may introduce additional issues including, for example, unacceptable latency and congestion spillover. Latency corresponds to the amount of time between when data is received and when that data is retransmitted.

Prior Art FIG. 1 illustrates one congestion spillover issue produced by buffering data. A network node 100 may handle traffic for two different stations, (e.g., STA1 110 and STA2 120). Data for both STA1 110 and STA2 120 may be received in network node 100 via channel 130. The data may be buffered in buffer 140. Buffer 140 may store traffic (e.g., data, packets) for both STA1 110 and STA2 120. Buffer 140 may employ a first-in first-out (FIFO) approach. Example packets in buffer 140 are labeled with their destinations (e.g., STA1, STA2).

If the path to STA1 110 is congested or slow, and if a burst of traffic for STA1 110 arrives via the relatively faster channel 130, then the buffer 140 may fill with packets for STA1 110. Now consider a packet arriving for STA2 120. The path to STA2 120 may be uncongested and fast. However, a packet arriving for STA2 120 may be placed in the buffer 140 behind all the packets waiting for retransmission over the congested or slow path to STA1 110. A delay between the network node 100 and STA1 110 has spilled over and created a delay between network node 100 and STA2 120 even though there is no actual delay between network node 100 and STA2 120. This delay may produce unacceptable latency for the packet for STA2 120.

At first glance, it may seem appropriate to simply configure network node 100 with separate buffers for separate destinations. However, this intuitive approach may actually be very complicated to implement and may require significant additional expensive resources for a network node.

While Prior Art FIG. 1 introduces congestion spillover leading to unacceptable latency using traffic for two stations, latency issues due to buffering data may be present with a larger number of stations, or even with a single station. Additionally, while a network node 100 acting as an access point (AP) for stations STA1 110 and STA2 120 is illustrated, other non-AP network nodes (e.g., routers, bridges, repeaters) may experience similar latency issues.

A single station could experience unacceptable latency when, for example, the ingress interface is much faster than the egress interface to that single station. In some circumstances, dropping data or dropping a packet may be preferable to holding on to a packet for an unacceptably long period of time before retransmitting the packet.

SUMMARY

In one embodiment a method includes determining a transmission latency for a data item exiting a transmission buffer and selectively manipulating a size of the transmission buffer based on the transmission latency for the data item.

In another embodiment, an apparatus includes a processor, a memory configured to store a transmission buffer, a set of logics, and an interface to connect the processor, the memory, and the set of logics. The set of logics includes a first logic configured to selectively add a packet to the transmission buffer, to determine an insert time at which the packet was added to the transmission buffer, and to store a pending data that identifies an amount of data pending for transmission from the transmission buffer at the insert time. The second logic is configured to determine an exit time at which the packet left the transmission buffer. The third logic is configured to determine a latency for the packet based on the insert time and the exit time. The fourth logic is configured to control a size of the transmission buffer based on the latency.

In another embodiment, a non-transitory computer readable medium stores computer executable instructions that when executed by a network node control the network node to perform a method. The method includes computing latency experienced by a packet transiting a transmission buffer in the network node. The latency is based on a time the packet entered the transmission buffer and a time the packet exited the transmission buffer. The method also includes computing an egress rate for the transmission buffer. The egress rate is based on the latency and an amount of data exiting the transmission buffer during the latency. The method also includes computing a size for the transmission buffer based on the egress rate and physically transforming the network node by setting the transmission buffer size to the buffer size.

BRIEF DESCRIPTION OF THE DRAWINGS

The accompanying drawings, which are incorporated in and constitute a part of the specification, illustrate various systems, apparatuses, methods, and other embodiments. It will be appreciated that the illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

Prior Art

DETAILED DESCRIPTION

Figure 1:
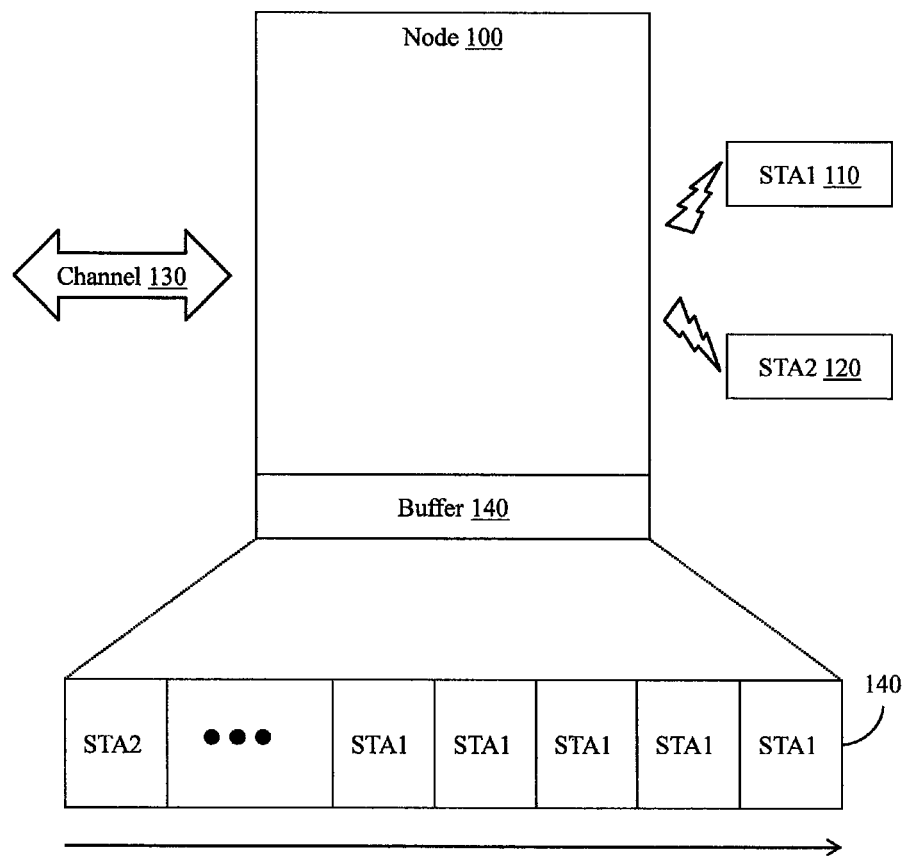
FIG. 1 illustrates a shared buffer producing spillover congestion that produces unacceptable latency.

Example systems and methods recognize that sometimes it may be preferable to drop some data or to drop some packets rather than to hold on to the data or the packets for an unacceptably long period of time before retransmitting the data or packets. Therefore, example systems and methods adjust the size of a buffer in a network node based on latency observed for the transmit buffer. The amount of the adjustment may be based on the egress rate observed for the transmit buffer.

When latency is acceptable, a buffer size may be allowed to grow towards a maximum size. When latency is unacceptable, a buffer size may be reduced towards a minimum size. Thus, buffer, size may be dynamically manipulated in response to observed conditions (e.g., on the fly in operation) in order to attain a desired balance between latency and dropped packets.

Reducing the size of a buffer may result in some dropped data or some dropped packets, but reducing the size of a buffer will also reduce latency. As the size of a buffer is reduced, the buffer can only hold onto data or packets for a shorter period of time. Reducing the size of a buffer may mitigate issues associated with unacceptable latency caused by spillover congestion or other reasons. Allowing the size of a buffer to increase (or lengthen) in response to acceptable latency facilitates accommodating peak throughput demands.

In one example, a target maximum latency may be defined for an apparatus (e.g., network node). The size of a buffer for the apparatus, which may also be referred to as the buffering level for the apparatus, may be adjusted in response to observed latency so that latency will tend to remain below the target maximum latency.

In one embodiment, a closed loop technique monitors an egress rate and a latency for the network node, and adjusts the buffer size based on the monitoring. In one embodiment, the egress rate is defined as the number of bytes in the buffer at the time the data entered the buffer divided by the amount of time the data spent in the buffer. In one embodiment, latency is defined as the difference between the time data entered the buffer and the time data left the buffer. In some embodiments, data may be monitored in the aggregate as, for example, packets, rather than as individual bits or bytes. Thus, latency may be defined as the difference between the time a packet entered a buffer and the time the packet exited the buffer.

In one embodiment, every packet that transits a network node via a buffer is monitored for arrival time and departure time. In this embodiment, latency and egress rate may also be computed for every packet. In another embodiment, less than every packet is monitored. In yet another embodiment, monitoring is performed periodically, rather than on a per packet basis.

The following pseudocode illustrates one embodiment of adjusting the size of a buffer based on observed latency and egress rate. The pseudocode includes a TX_packet routine and a TX_done_packet routine. The TX_packet routine is called to place a packet in an egress buffer. The TX_done_packet routine is called when the packet has been sent out through the egress interface.

```
TX_packet: // buffer packet or drop packet
// is the buffer already full?
If ((Buffer.current_bytes_in_buffer+packet.len)>
Buffer.bytes_allowed)
{
// the buffer is already full
Drop packet;
}
Else
{
// the buffer is not full
Add_packet_to_buffer (Buffer, packet) //so buffer the
   packet
Packet.timestamp=current_time( ); // timestamp the packet
Buffer.current_bytes_in_buffer+=packet.len;  // update
   buffer count
// store how many bytes are waiting to be transmitted before
   this pkt
Packet.bytes_in_buffer=buffer.current byte_in_buffer;
}// end if
// end TX_packet
TX_done_packet: // packet is exiting the egress buffer
Latency=current_time( )-packet.timestamp;  // compute
latency
// determine whether latency is too high
If (latency >MAX_TARGET_LATENCY)
{
// latency exceeds maximum desired latency
Egress_rate=packet.bytes_in_buffer/latency;  // compute
   egress rate
// change the buffer size
Buffer.bytes_allowed=egress_rate * MAX_TARGET_
   LATENCY;
// update the buffer count
Buffer.current_bytes_in_buffer-=packet.len;
}
Else
{
// latency is okay
// make the buffer larger, up to limit of MAX_BUFFER-
   _SIZE
If (Buffer.bytes_allowed <MAX_BUFFER_SIZE)
{
   Buffer.bytes_allowed+=growth_amount;
}// end if
// end if
// end TX_done_packet
```

In one example, the test
If (latency >MAX_TARGET_LATENCY)
may take form of
If (latency >(MAX_TARGET_LATENCY * factor))
so that the size of the buffer can be adjusted before the maximum latency is reached. To achieve this, factor may be a real number greater than zero and less than one.

Figure 2:
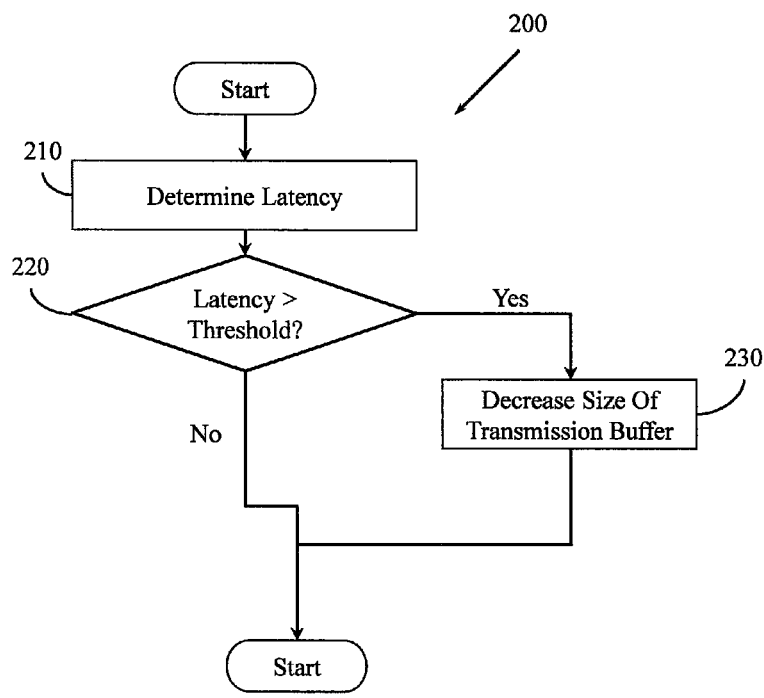
FIG. 2 illustrates one embodiment of a method associated with adjusting the size (or length) of a buffer in a network node.

FIG. 2 illustrates a method 200 associated with controlling the length of a transmission buffer. The control may be, for example, latency based. Thus, the size of a transmission buffer may be manipulated (e.g., lengthened, shortened) based on the amount of latency being experienced by packets or data as the packets or data transit the transmission buffer. At 210, method 200 includes determining a transmission latency for a data item exiting a transmission buffer. In one example, determining the transmission latency involves comparing the time at which the data item exited the transmission buffer to the time at which the data item entered the transmission buffer. For example, the entry time may be subtracted from the exit time. In different embodiments, the data item may be a bit, a byte, a packet, or other pieces of data. In one example, the transmission buffer is an egress buffer in a network node. In different embodiments, the network node may be an access point (AP), a station (STA), a router, or other data buffering device.

At 220, a determination is made concerning whether the transmission latency exceeds a threshold. The determination may concern, for example, whether the latency exceeds a maximum acceptable or a maximum desired latency. In one embodiment, method 200 may also include establishing a maximum desired latency and may even include re-establishing a maximum desired latency.

If the determination at 220 is Yes, that the latency does exceed a threshold, then at 230 method 200 includes selectively manipulating the size of the transmission buffer based on the transmission latency. In one example, selectively manipulating the size of the transmission buffer includes selectively shortening the size of the transmission buffer. In different examples, the transmission buffer may be shortened to a pre-determined size, may be shortened by a pre-determined amount, may be shortened to a pre-determined minimum size, may be shortened by a variable amount, and so on. The size may be constrained to not fall below a minimum size.

In method 200, if the determination at 220 is no, that the latency does not exceed a threshold, then the size of the transmission buffer may not be manipulated. However, it may be desirable to allow the transmission buffer to grow when latency is acceptable. Therefore, method 300 (FIG. 3) illustrates one example where the size of the buffer can grow when latency is acceptable.

Figure 3:
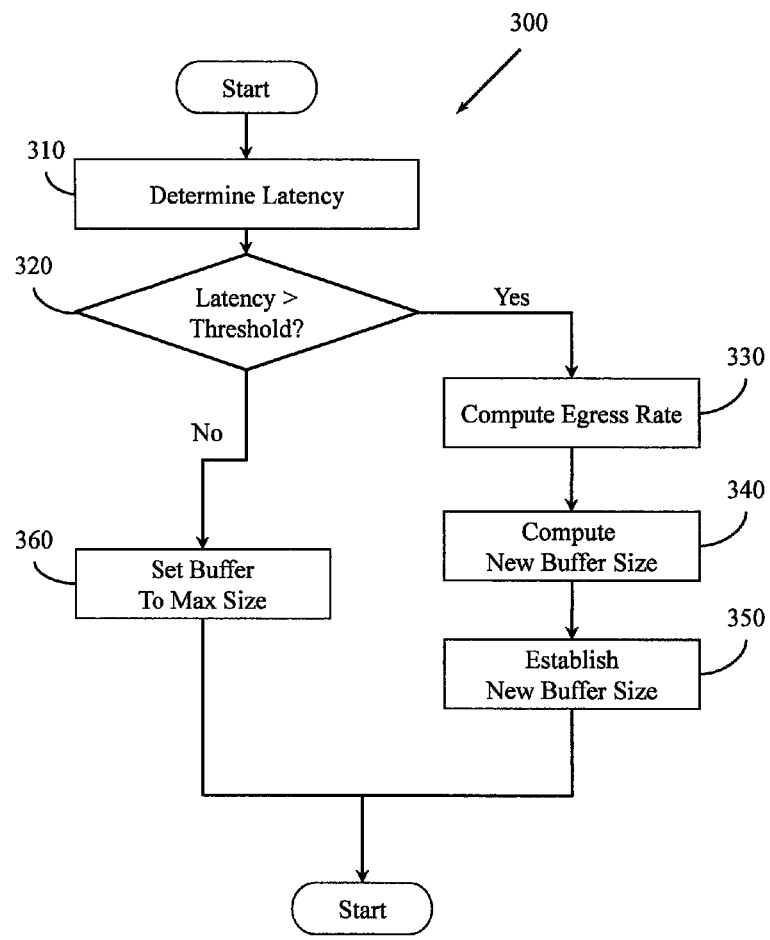
FIG. 3 illustrates one embodiment of a method associated with adjusting the size of a buffer in a network node.

FIG. 3 illustrates a method 300 associated with controlling the size of a buffer based on latency. At 310, method 300 includes determining latency being experienced by data as the data passes through a transmission buffer. Determining the latency can include, for example, subtracting an entry time from an exit time.

At 320, a determination is made concerning whether the latency exceeds a threshold. In one example, the determination may compare the latency to 100% of the threshold or to a fraction of the threshold. Comparing the latency to a fraction of the threshold facilitates manipulating the size of the buffer before unacceptable latency occurs.

If the determination at 320 is no, that the latency is less than a threshold, then at 360 the buffer may be set to the maximum size. In a different embodiment, the buffer may be allowed to grow by a fixed amount or by a variable amount rather than automatically being increased to the maximum size. Thus, more generally, method 300 includes selectively increasing the size of the transmission buffer upon determining that the transmission latency is less than a threshold latency.

If the determination at 320 is yes, that the latency does exceed a threshold, then at 330 an egress rate for the transmission buffer is determined. In one example, the egress rate is determined based on the transmission latency. For example, determining the egress rate may include comparing the amount of data that exited the transmission buffer between the time at which the data item entered the transmission buffer and the time at which the data item exited the transmission buffer.

With the latency and the egress rate having been computed and available, method 300 proceeds, at 340, to compute a new size of the buffer. The new size of the buffer may be computed based on the egress rate. For example, the new size of the buffer may vary directly with the egress rate. Thus, if the egress rate is much less than a first threshold then the size of the buffer may be reduced by a first large amount while if the egress rate is only slightly less than the first threshold then the size of the buffer may be reduced by a second smaller amount. In different examples the function may be a linear function, a quadratic function, a geometric function, or other function. In one example, computing the size of the transmission buffer involves multiplying the egress rate by a maximum acceptable latency for the transmission buffer. Method 300 also includes, at 350, establishing the size of the buffer as the size computed at 340.

In different embodiments, method 300 may compute the transmission latency or the egress rate at different times and according to different schedules. For example, method 300 may compute the transmission latency or egress rate according to schedules including, but not limited to, for every packet that enters the transmission buffer, for less than every packet that enters the transmission buffer, and periodically.

Figure 4:
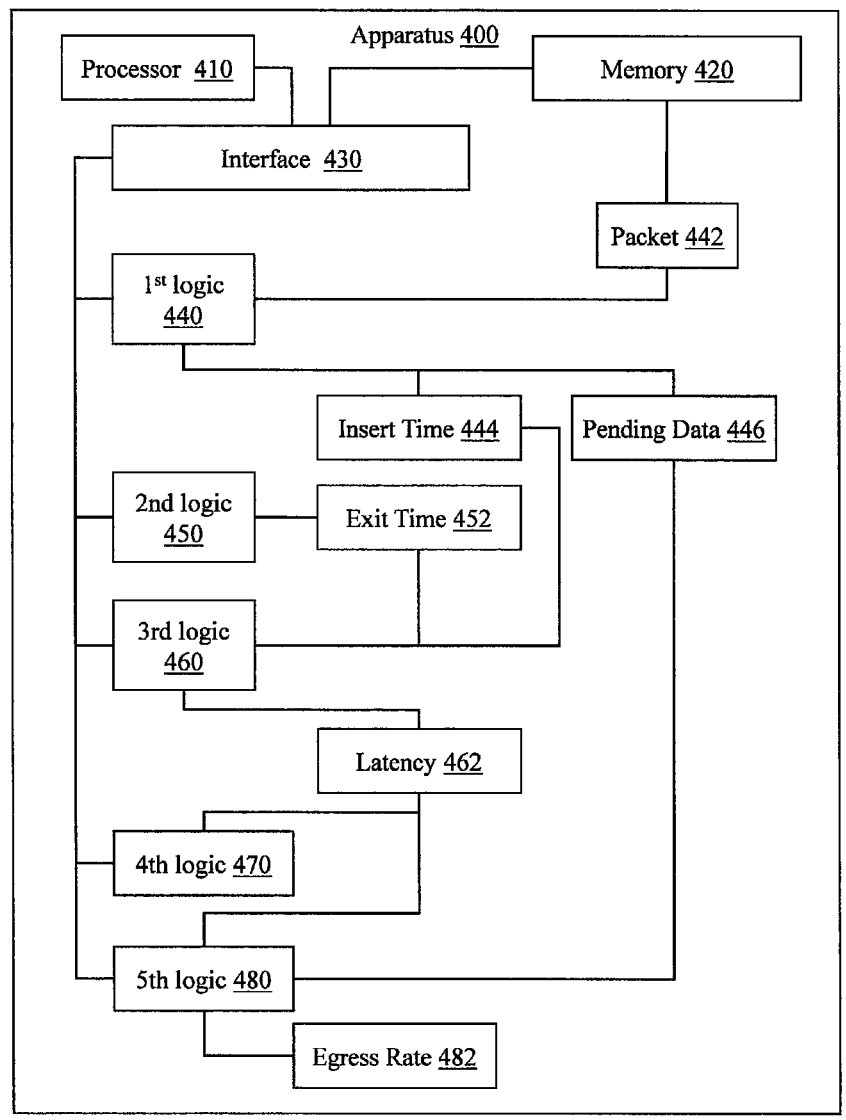
FIG. 4 illustrates one embodiment of an apparatus associated with adjusting the size of a buffer in a network node.

FIG. 4 illustrates an apparatus 400 associated with controlling buffer size based on latency. Apparatus 400 includes a processor 410, a memory 420 configured to store a transmission buffer, a set of logics (e.g., 440, 450, 460, 470, 480) and an interface 430 to connect the processor 410, the memory 420, and the set of logics.

The set of logics may include a first logic 440 that is configured to selectively add a packet 442 to the transmission buffer. While a packet 442 is described, first logic 440 may add data to a transmission buffer in other amounts (e.g., bit, byte). First logic 440 is also configured to determine an insert time 444 at which the packet 442 or data was added to the transmission buffer. First logic 440 is also configured to store a data item that identifies an amount of data pending for transmission from the transmission buffer at the insert time. The data item may be, for example, a pending data 446. Thus, the first logic 440 places data in the transmission buffer and stores data about when the data was placed in the transmission buffer and how much data was waiting to be transmitted from the transmission buffer at that time.

The set of logics may also include a second logic 450 that is configured to determine an exit time 452 at which the packet left the transmission buffer. Once again, the second logic 450 may determine the time at which bits, bytes, packets, or other quanta of data leave the transmission buffer.

The set of logics may also include a third logic 460 that is configured to determine a latency 462 for the packet based on the insert time 444 and the exit time 452.

The set of logics may also include a fourth logic 470 that is configured to control a size of the transmission buffer based on the latency 462. For example, if the latency 462 exceeds a threshold then the fourth logic 470 may decide to make the transmission buffer smaller while if the latency 462 is less than the threshold then the fourth logic 470 may decide to make the transmission buffer larger.

The set of logics may also include a fifth logic 480 that is configured to determine an egress rate 482 for the transmission buffer. The fifth logic 480 may compute the egress rate 482 based on the latency 462 and the pending data 446. In one embodiment, the fourth logic 470 may also be configured to control the size of the transmission buffer based on the latency 462 computed by the third logic 460 and the egress rate 482 computed by the fifth logic. In one example, the fourth logic 470 is configured to set the size of the transmission buffer to a size equaling the egress rate 482 times a maximum target latency for the transmission buffer.

Figure 5:
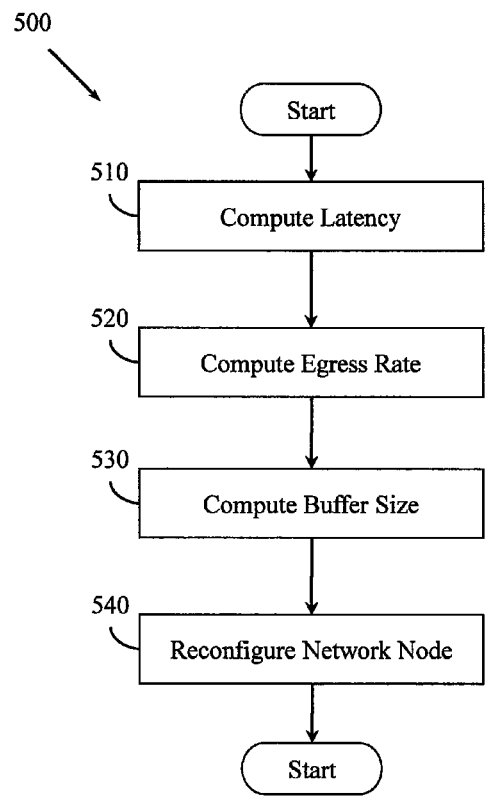
FIG. 5 illustrates one embodiment of a method associated with adjusting the size of a buffer in a network node.

FIG. 5 illustrates a method 500 associated with controlling buffer size based on latency. A non-transitory computer-readable medium may store computer executable instructions that when executed by a network node control the network node to perform method 500. In some embodiments, other methods described herein may also be stored on a non-transitory computer-readable medium.

At 510, method 500 includes computing a latency experienced by a packet transiting a transmission buffer in the network node. The latency may be determined based on a time the packet entered the transmission buffer and a time the packet exited the transmission buffer. For example, the latency may be the difference between the entry and exit times. The latency describes how long the packet was buffered.

At 520, method 500 also includes computing an egress rate for the transmission buffer. The egress rate may be determined based on the latency and an amount of data exiting the transmission buffer during the latency. For example, the egress rate may be the amount of data exiting the transmission buffer divided by the amount of time the packet spent in the buffer. The egress rate describes how quickly data is leaving the transmission buffer.

At 530, method 500 also includes computing a buffer size for the transmission buffer based on the egress rate. If the egress rate is acceptable, then the size of the buffer may remain the same or may be allowed to grow. If the egress rate is unacceptable (e.g., too long), then the size of the buffer may be reduced.

At 540, method 500 also includes physically transforming the network node by setting the size of the transmission buffer to the size of the buffer. A first network node with a buffer having a capacity of 256k is a physically different thing than a second network node with a buffer having a capacity of 16k in the same way that a 50 gallon barrel is different from a 5 gallon bucket. The first network node can store much more data, is less likely to drop packets, but may have longer latency. The second network node can store much less data, is more likely to drop packets, but may have shorter latency.

Thus, in one embodiment, method 500 defines a target maximum latency and adjusts the buffering level to ensure that the observed latency does not exceed the target maximum latency. This is achieved through a closed loop scheme, in which the current egress rate and latency is monitored and used to adjust the buffering level. For a queued packet, latency is measured by subtracting the absolute time at which the packet was queued from the absolute time at which the packet completed transmission. The total amount of data (in bytes) transmitted during this period is also tracked to calculate the average egress rate during this interval. In order to limit the processing overhead, in different embodiments latency can be examined once every few packets instead of every packet or once every fixed period (e.g. every 100 ms).

In one embodiment, method 500 reduces the overall buffer size for all the stations even when packets for one of the stations are slow to go out. This may be unfair to stations whose packets are not slow and that share this buffer and have bursty traffic. Since the overall buffer size is reduced, the buffer cannot accommodate the burst destined for the other good stations. Therefore, in one embodiment, method 500 may keep track of the egress byte rate for stations and put per-sta limits on buffering data to the common buffer.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A method, comprising:
   determining a transmission latency for a data item exiting a transmission buffer;
   determining an egress rate for the transmission buffer based on the transmission latency;
   determining whether the transmission latency will exceed a maximum acceptable latency for the transmission buffer based at least in part on the egress rate for the transmission buffer; and
   selectively manipulating a size of the transmission buffer based on the transmission latency for the data item so that the transmission latency does not exceed the maximum acceptable latency.

2. The method of claim 1, further comprising:
wherein selectively manipulating the size of the transmission buffer based on the transmission latency for the data item comprises selectively manipulating the size of the transmission buffer based on the egress rate.

3. The method of claim 2, further comprising determining the transmission latency and the egress rate for every packet that enters the transmission buffer, less than every packet that enters the transmission buffer, or periodically.

4. The method of claim 1, wherein the transmission buffer is an egress buffer in a network node.

5. The method of claim 4, wherein the data item is a packet.

6. The method of claim 4, wherein the network node is one of (i) an access point, (ii) a station, and (iii) a router.

7. The method of claim 1, wherein determining the transmission latency comprises comparing a time at which the data item exited the transmission buffer to a time at which the data item entered the transmission buffer.

8. The method of claim 1, wherein determining the egress rate comprises comparing an amount of data that exited the transmission buffer between (i) the time at which the data item entered the transmission buffer and (ii) the time at which the data item exited the transmission buffer.

9. The method of claim 1, wherein selectively manipulating the size of the transmission buffer comprises shortening the transmission buffer by an amount that depends on the egress rate.

10. The method of claim 1, wherein selectively manipulating the size of the transmission buffer comprises setting the size of the transmission buffer to a size that equals the egress rate multiplied by the maximum acceptable latency for the transmission buffer.

11. The method of claim 1, wherein selectively manipulating the size of the transmission buffer comprises selectively increasing the size of the transmission buffer upon determining that the transmission latency is less than the maximum acceptable latency.

12. The method of claim 11, wherein selectively increasing the size of the transmission buffer comprises setting the size of the transmission buffer to a maximum size allowed for the transmission buffer.

13. The method of claim 1, wherein selectively manipulating the size of the transmission buffer comprises selectively increasing the size of the transmission buffer upon determining that the transmission latency is less than a threshold latency.

14. An apparatus, comprising:
a processor;
a memory configured to store a transmission buffer;
a set of logics; and
an interface to connect the processor, the memory, and the set of logics,
wherein the set of logics comprises:
a first logic configured to selectively add a packet to the transmission buffer, to determine an insert time at which the packet was added to the transmission buffer, and to store a pending data that identifies an amount of data pending for transmission from the transmission buffer at the insert time;
a second logic configured to determine an exit time at which the packet left the transmission buffer;
a third logic configured to determine a latency for the packet based on the insert time and the exit time; and
a fourth logic configured to:
determine an egress rate for the transmission buffer based on the latency and the pending data;
determine whether the latency will exceed a maximum acceptable latency for the packet based, at least in part, on the egress rate for the transmission buffer; and
control a size of the transmission buffer based on the latency so that the transmission latency does not exceed the maximum acceptable latency.

15. The apparatus of claim 14, wherein the fourth logic is further configured to control the size of the transmission buffer based on the latency and the egress rate.

16. The apparatus of claim 14, wherein the fourth logic is configured to increase the size of the transmission buffer upon determining that the latency is less than the maximum acceptable latency, and wherein the transmission buffer has a maximum size.

17. The apparatus of claim 14, wherein the fourth logic is configured to decrease the size of the transmission buffer upon determining that the latency exceeds the maximum acceptable latency, and wherein the transmission buffer has a minimum size.

18. The apparatus of claim 14, wherein the fourth logic is configured to set the size of the transmission buffer to a size equaling the egress rate times the maximum acceptable latency for the transmission buffer.

19. A non-transitory computer-readable medium storing computer executable instructions that when executed by a network node control the network node to perform a method, the method comprising:
computing a latency experienced by a packet transiting a transmission buffer in the network node, wherein the latency is based on a time the packet entered the transmission buffer and a time the packet exited the transmission buffer;
computing an egress rate for the transmission buffer, wherein the egress rate is based on the latency and an amount of data exiting the transmission buffer during the latency;
determining whether the transmission latency will exceed a maximum acceptable latency for the transmission buffer based at least in part on the egress rate for the transmission buffer;
computing a buffer size for the transmission buffer based on the egress rate; so that the transmission latency does not exceed the maximum acceptable latency; and
physically transforming the network node by setting the transmission buffer size to the buffer size.

* * * * *